United States Patent
Chang et al.

(10) Patent No.: US 6,862,278 B1
(45) Date of Patent: Mar. 1, 2005

(54) SYSTEM AND METHOD USING A PACKETIZED ENCODED BITSTREAM FOR PARALLEL COMPRESSION AND DECOMPRESSION

(75) Inventors: Luke Y. Chang, Mountain View, CA (US); Michael L. Fuccio, Sunnyvale, CA (US); John C. Liu, Cupertino, CA (US); Gordon Max Elder, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/099,742

(22) Filed: Jun. 18, 1998

(51) Int. Cl.[7] .......................... H04L 12/28; H04L 12/56
(52) U.S. Cl. ...................... 370/389; 370/468; 370/474; 370/477; 370/479; 370/506; 370/514; 348/384.1; 348/403.1; 348/420.1; 348/427.1; 348/440.1; 375/240.24; 375/240.29
(58) Field of Search ................................ 370/389, 468, 370/474, 477, 479, 506, 514, 470, 535, 537; 348/384.1, 403.1, 420.1, 427.1, 440.1, 385.1; 375/240.24, 240.29, 240.26, 240.28, 240.01, 240.12

(56) References Cited

U.S. PATENT DOCUMENTS

| | | | | |
|---|---|---|---|---|
| 5,389,965 A | * | 2/1995 | Kuzma | 348/14.12 |
| 5,544,161 A | * | 8/1996 | Bigham et al. | 370/397 |
| 5,686,965 A | * | 11/1997 | Auld | 375/240.01 |
| 5,717,394 A | * | 2/1998 | Schwartz et al. | 341/51 |
| 5,729,228 A | * | 3/1998 | Franaszek et al. | 341/106 |
| 5,872,784 A | * | 2/1999 | Rostoker et al. | 370/395 |
| 5,909,638 A | * | 6/1999 | Allen | 725/146 |
| 5,963,596 A | * | 10/1999 | Bembassat et al. | 375/243 |

* cited by examiner

Primary Examiner—Dang Ton
Assistant Examiner—Inder Pal Mehra
(74) Attorney, Agent, or Firm—Woodcock Washburn LLP (57) ABSTRACT

A system and method are disclosed for parallel compression and decompression of a bitstream. For compression, the bitstream is separated into a plurality of components, and the components are encoded using a compression algorithm. Packets are then constructed from the encoded components. At least one packet is associated with each encoded component and comprises header information and encoded data. The packets are combined into a packetized encoded bitstream. For decompression, the packets are separated from the packetized encoded bitstream using the header information. The packets are then decoded in parallel using a decompression algorithm to recover the encoded data. The plurality of components are reconstructed from the recovered encoded data and combined to recover the bitstream.

2 Claims, 7 Drawing Sheets

SYSTEM AND METHOD USING A PACKETIZED ENCODED BITSTREAM FOR PARALLEL COMPRESSION AND DECOMPRESSION

TECHNICAL FIELD OF THE INVENTION

The present invention relates in general to the field of data compression and decompression and, more particularly, to a system and method using a packetized encoded bitstream for parallel compression and decompression.

BACKGROUND OF THE INVENTION

Compression and decompression algorithms are widely used for processing digital bitstreams, especially where the bitstreams represent digitized audio, video, graphics, etc. One such algorithm is the a lossless compression format (LCF) used in a number of products from SILICON GRAPHICS. The LCF format is related to a format presented in a NASA JPL paper entitled "Algorithms for a Very High Speed Universal Noiseless Coding Module" by Robert F. Rice, Pen-Shu Yeh and Warner Miller (the Rice algorithm). LCF is a lossless compression format that is relatively simple to implement in hardware, thus there is a desire to use LCF in products that process large amounts of real-time data, including high-performance applications like HDTV image compression. However, a problem arises in that the performance needed to encode/decode, for example, HDTV resolution images at video rates is not generally possible using the conventional LCF architecture and application specific integrated circuit (ASIC) technology. To overcome problems with performance, some compression schemes try to process separate bitstreams using parallel processing paths. However, this typically is not helpful in improving performance within a single bitstream.

SUMMARY OF THE INVENTION

In accordance with the present invention, a system and method are disclosed that use a packetized encoded bitstream for parallel compression and decompression and that provide significant advantages over conventional compression and decompression schemes.

According to one aspect of the present invention, a method is provided for parallel compression and decompression of a bitstream. For compression, the bitstream is separated into a plurality of components, and the components are encoded using a compression algorithm. Packets are then constructed from the encoded components. At least one packet is associated with each encoded component and comprises header information and encoded data. The packets are combined into a packetized encoded bitstream. For decompression, the packets are separated from the packetized encoded bitstream using the header information. The packets are then decoded in parallel using a decompression algorithm to recover the encoded data. The plurality of components are reconstructed from the recovered encoded data and combined to recover the bitstream.

According to another aspect of the present invention, a system is provided for parallel compression and decompression of a bitstream. The system includes an encoder system and a decoder system. The encoder system comprises a plurality of encode units that receive components separated from a bitstream and encode the components using a compression algorithm. The encode units then construct packets from the encoded components, where at least one packet is associated with each encoded component and comprises header information and encoded data. The encoder system also comprises a multiplexer coupled to the encode units. The multiplexer combines the packets into a packetized encoded bitstream. The decoder system comprises a feeder that separates packets from the packetized encoded bitstream. The decoder system also comprises a plurality of decode queues, and the feeder distributes the packets to the decode queues. Further, the decoder system comprises a plurality of decode units each associated with one of the decode queues. The decode units decode packets using a decompression algorithm to recover the encoded data and to reconstruct the components. The decoder system then comprises a demultiplexer coupled to the plurality of decode units that combines the plurality of components to recover the bitstream.

A technical advantage of the present invention is the ability to parallelize a compressed, variable-length bitstream in the decoding process. Markers or headers can be used in the bitstream to break up the data into parallelizable tasks. This allows the location to be identified, for example, of specific pixels or samples. Otherwise, without markers to assist in breaking up the data, the only way to determine the location of specific pixels or samples in the bitstream would be by actually decoding the bitstream.

Another technical advantage of the present invention is the parallelization of LCF to achieve greater performance. Parallelization can be accomplished using a packetized bitstream having fixed-sized and variable-sized packets. This provides a lossless compression format that is readily parallelizable.

A further technical advantage of the present invention is the breaking up of a single bitstream into fixed-size packets which encode a variable number of samples. Each packet can start with a fixed-length tag which directs each packet to a specific decoder unit. Since each packet has a fixed-length with a tag field for directing, a distributor can efficiently send different packets to different decoder units which can then process the packets in parallel. This scheme can attain parallelism at a low level so the encode/decode, for example, of a single picture can be parallelized without needing the complexity of trying to achieve parallelism by processing multiple pictures (streams) concurrently. The distribution of packets for decoding can be rapidly done because the packets are fixed-length and the fixed-size tag bits direct the packets. Also, the tag field overhead can be quite low. Further, the buffering requirements for both encode and decode can be quite reasonable which is important in achieving high-performance through an on-chip memory.

An additional technical advantage of the present invention is the breaking up of a single bitstream into variable-size packets with each packet encoding the same number of samples. Each packet can be independent which means no other information is needed from other packets to decode the current packet. Each packet can start off with a length marker, giving the length of the packet. Since each packet has a length field and each packet is independent, a distributor can efficiently send different packets to different decode units which can process the packets in parallel. This scheme also can attain parallelism at a low level so the encode/decode, for example, of a single picture can be parallelized without needing the complexity of trying to achieve parallelism by processing multiple pictures (streams) concurrently. Further, the bitstream is extremely flexible so the exact same bitstream can be used to achieve scaling amounts of parallelism. Any number of processing units can be used on the same bitstream. This flexibility allows a hardware implementation (and the number of processing units) to be independent from the bitstream format. Also, this scheme has a straightforward input/output interface. For both encoding and decoding, the hardware can access pixels in simple scan-line order, left-to-right, top-to-bottom. Further, this scheme provides good load balancing. Even though the packets are variable size, each packet can represent (approximately) the same amount of work to encode/decode because each packet encodes the same number of samples. As a result, the distribution of packets to different processing units represents an equal sharing of the work. Finally, the buffering requirements for both encode and decode are reasonable to help achieve high-performance through on-chip memory.

Other technical advantages of the present invention should be readily apparent from the drawings, specification and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
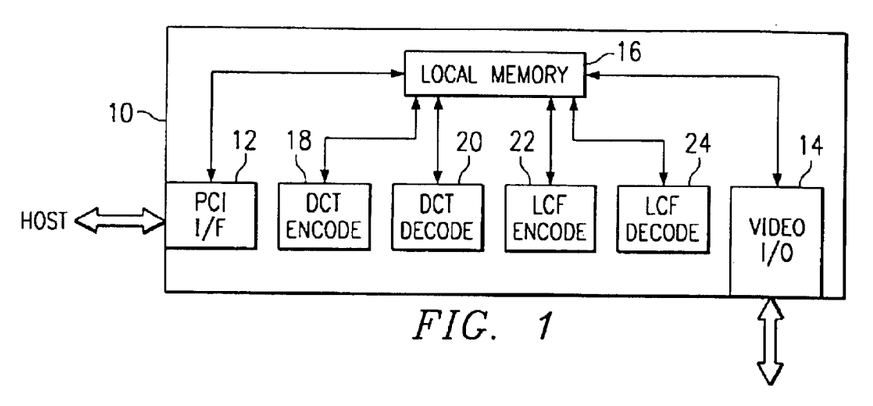
FIG. 1 is a block diagram of one embodiment of a video processing card using LCF encoding and decoding.

FIG. 1 is a block diagram of one embodiment of a video processing 10 using lossless compression format (LCF) encoding and decoding. As shown, card 10 has a PCI bus interface 12 that can communicate across a PCI bus with a host system. Card 10 also has a video interface 14 that can communicate with a monitor or other video device. Both PCI interface 12 and video interface 14 can access local memory 16 on card 10. Local memory 16 provides storage and workspace for on-card processing. In the embodiment of FIG. 1, card 10 has two encode/decode sections coupled to access local memory 16. Card 10 has a discrete cosine transform (DCT) encode unit 18 and a DCT decode unit 20, and card 10 has an LCF encode unit 22 and an LCF decode unit 24. In operation, LCF encode unit 22 and LCF decode unit 24 can implement parallel compression using a packetized bitstream according to the present invention. Card 10 can provide high performance video processing for the host system.

Figure 2:
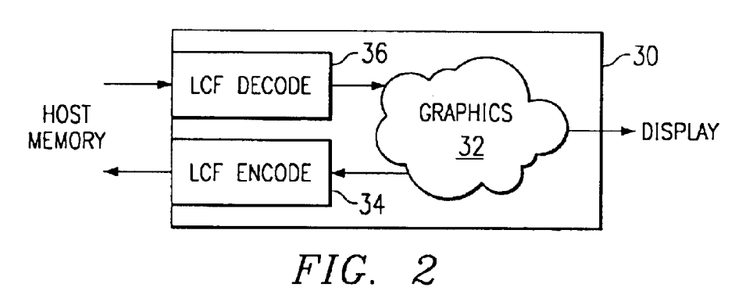
FIG. 2 is a block diagram of one embodiment of a graphics system 30 using LCF encoding and decoding.

FIG. 2 is a block diagram of one embodiment of a graphics system 30 using LCF encoding and decoding. As shown, graphics system 30 has a graphics engine 32 that can provide an output for display. Graphics engine 32 is coupled to an LCF encode unit 34 and an LCF decode unit 36. Both LCF encode unit 34 and LCF decode unit 36 are coupled to host system memory. In operation, LCF encode unit 34 and LCF decode unit 36 can implement parallel compression using a packetized bitstream according to the present invention. Graphics system 30 can provide high end graphics processing functions. FIG. 1 and FIG. 2 provide examples of hardware applications in which parallel compression using a packetized bitstream can be implemented. It should be understood that various other hardware and software applications also could benefit from such a compression scheme.

In this context, the "block" is generally used herein to refer to a group of several consecutive samples which are encoded together using the same compression mode. The term "packet" is generally used to mean a fixed-length or variable-length set of bits that contains some portion of a block. In the case of fixed-length packets, a packet may contain a fraction of a block, one block, or multiple blocks. In the case of a variable-length packet, the packet often contains multiple blocks. The term "multi-pack" generally refers to the packets needed to encode a V×H region where, for example, data is compressed using V×H rectangular regions of pixels, left-to-right, top-to-bottom. (V is the number of lines, and H is the number of pixels per line.) The term "unit" generally refers to a processing pipeline for decoding or encoding LCF data in serial fashion. Conventional LCF consists of a single decode unit and a single encode unit. The present invention achieves parallelism and uses multiple decode and encode units. The term "system" generally refers to the logic used for either decoding or encoding a bitstream, including input/output interfaces and multiple units. The decode system and encode system may both have multiple units.

Conventional LCF

The following is a general description of LCF which should provide a helpful context. LCF involves encoding blocks of deltas. For LCF, the number of deltas in a block is typically either 15 or 16. These deltas are obtained by performing Differential Pulse Code Modulation (DPCM) on the samples. The previous (left) horizontal sample ($x_{i-1}$) is used as a predictor for the current sample ($x_i$). The equation is:

$$\Delta = x_i - x_{i-1}$$

At the start of each scan line, the predictor is reset. The first sample of the line is used as the reset predictor value.

Figure 3:
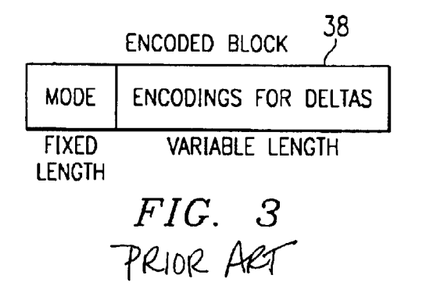
FIG. 3 is a diagram of a conventional LCF encoded block.

FIG. 3 is a diagram of a conventional LCF encoded block 38. As shown, each encoded block 38-consists of two parts: a mode field and the encoded deltas. The mode field is a fixed number of bits (e.g., 3 bits for 8-bit samples and 4 bits for 9, 10, 11, or 12-bit samples). The encoded deltas are a variable number of bits and represent the actual data encoded using the specified compression mode.

There are several shortcomings in conventional LCF that can make parallelism difficult. The blocks are dependent on each other. The last sample from the previous block needs to be decoded in order for it to be used as the predictor for the first sample in the current block. As a result, parallelism at a block granularity is difficult. The predictor is reset only at each line boundary so the unit of independence for LCF is a line which, for example, for HDTV resolution could be up to 1920 samples. From a hardware perspective, using on-chip memory to buffer an HDTV line per processing unit is very expensive. In addition to the buffering issue, trying to distribute the independent segments of data efficiently is a problem. There are no markers or alignments (except double-word alignment at the end of a picture) in the LCF bitstream. Without markers, it is not possible to determine where one encoded line ends and the next one begins unless the bitstream is actually decoded and a count of decoded samples is made.

Fixed-Length Packet

Figure 4:
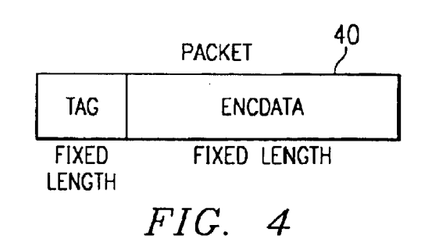
FIG. 4 is a diagram of one embodiment of a fixed-length packet used for parallelism according to the present invention.

FIG. 4 is a diagram of one embodiment of a fixed-length packet 40 used for parallelism according to the present invention. The bitstream can be broken into fixed-size packets 40 which encode a variable number of samples. Each packet 40 can start with a fixed-length tag which directs the packet to a specific decoder. Since each packet is a fixed-length and has a tag for direction, a distributor can efficiently send different packets to different decode units which can then process the packets in parallel. As shown in FIG. 4, the Tag can be a fixed-length field used to direct the packet to a specific decoder unit. For example, if the Tag were "1", the packet would get directed to decoder unit "1". If a V×H region is encoded for the multi-pack, then the number of tag bits used is given by ceil($\log_2$(V)). In packet 40, the EncData field can contain a fixed-length of encoded data that has been encoded using regular LCF compression. Because packet 40 is fixed-length and LCF encoded data is variable-length, as the encoded data exceeds a packet boundary, the excess encoded data can be used to start a new packet 40.

An important point to note is that, in this embodiment, the tag information is embedded and distributed into the bitstream instead of having a table of information as header for the bitstream. A table of information would require both the encoder and decoder to buffer this information. With the embedded and distributed tag information, the buffering requirements for this information is minimal.

Figure 5:
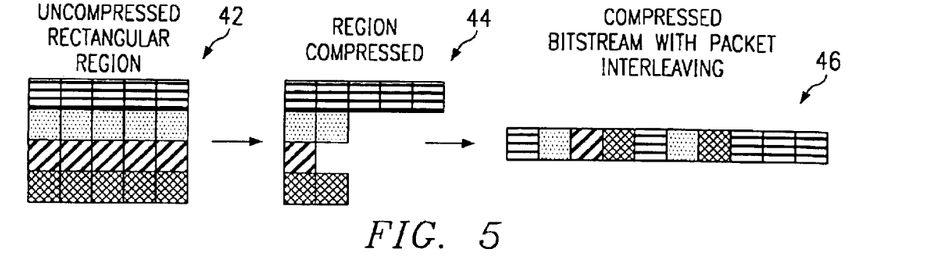
FIG. 5 is a diagram of one embodiment of interleaving fixed-length packets from multiple scan lines according to the present invention.

FIG. 5 is a diagram of one embodiment of interleaving fixed-length packets from multiple scan lines according to the present invention. As mentioned above, the unit of independence for LCF is a scan line. The fixed-length packet scheme for parallelization can take advantage of this by interleaving packets from multiple scan lines. For example, if parallelism by four is desired, four consecutive scan lines can be encoded and interleaved. As shown, an uncompressed rectangular region 42 can be compressed to form a compressed region 44. The compressed region 44 can then be formed into a bitstream 46 with packet interleaving. In this example, two tag bits could be used to distribute to four decoder units. Tag 0 could be used for packets that encode data from lines 0, 4, 8, etc. Tag 1 could be used for lines 1, 5, 9, etc. Tag 2 could be used for lines 2, 6, 10, etc., and Tag 3 could be used for lines 3, 7, 11, etc. Data is then encoded using a rectangular region of pixels, left-to-right, top-to-bottom. For example, if 32 pixels are encoded at a time and with parallelism by four, a 4×32 region would be encoded at a time. For each of the four different lines, a different tag could be used, and packets could be interleaved in a round-robin scheme. As shown in FIG. 5, the four segments (portions of lines) could have different compression ratios so the four compressed segments could each result in a different number of fixed-length packets. If this is the case, then after doing round-robin interleaving and running out of certain segments, the remaining segments would be interleaved in round-robin fashion, as shown. After interleaving all the packets for a region, any compressed data that is left over and that is not sufficient to create a new complete packet can be held over and combined with the data for the next 4×32 region to create whole packets.

Through the tags, an imbalance in the compression ratios does not complicate or break down the parallelization scheme. The decode system is not expecting nor does it know about any particular packet interleaving scheme. For the decoder system, packets can be distributed to different decoders solely through the tags. As a result, the parallelization scheme using these fixed-length packets works regardless of the compression ratios of the segments. Within a multi-pack, more of the packets may be directed to some decoder units than other units, but the tag scheme can ensure that the packets are efficiently steered to the correct decoders.

With respect to boundary conditions, a new packet can be started for each new scan line. If the last packet for a scan line only fills up a partial packet, then the packet can be padded with enough zero-valued bits to create a whole packet. The decoder can keep track of the number of samples per scan line to discard the zero-value bits, if necessary.

Data can be encoded using V×H regions. If the number of pixels in a scan line does not divide evenly by H, then the last pixel of a scan line can be replicated so that the number of pixels encoded in a line can be a multiple of H. If the number of lines in the picture does not divide evenly by V, then the last group of lines in the image can be parallelized by the number of lines left. For example, if an image has 31 lines and V is 4, then the last 3 lines can be encoded with only parallelism by 3. At the end of a compressed image, zero-value bits can be padded in to achieve double-word alignment for the compressed image. The decoder system then should be able to discard this zero-bit padding, if necessary.

With respect to component interleaving, fixed-length packetization can be done on a V×H rectangular region of pixels. Pixels generally consist of one or more components. The tag bits can be used to distribute the packets to different decoders, and the tag bits represent different scan lines. Within each scan line, the data can be encoded by interleaving blocks of components. This interleaving scheme can be the same one used for conventional LCF. Having the packetization scheme use the same interleaving pattern helps to simplify the logic that will be used to encode/decode both LCF and packetized LCF. For example, when encoding pixels which have four fully sampled components (RGBA, 4:4:4:4:), there would be block of R, then a block of G, then a block of B, and finally a block of A before moving on to the next set of pixels. It should be noted that when encoding each block, the resulting encoded block could form a fraction of a packet, one packet, or multiple packets. The interleaving schemes can be as set forth in the following table.

TABLE 1

| Format | Encode | Decode |
| --- | --- | --- |
| RGBA (4:4:4:4) | R, G, B, A | R, G, B, A |
| RGB (4:4:4) | R, G, B | R, G, B- |
| YCrCb (4:2:2) | Cb, $Y_0$, Cr, $Y_1$ | Cb, $Y_0$, Cr, $Y_1$ |
| YCrCbA | Cb, $Y_0$, $A_0$, Cr, $Y_1$, $A_1$ | Cb, $Y_0$, $A_0$, -Cr, $Y_1$, $A_1$, - |
| YAYA (4:0:0:4) | $Y_0$, $A_0$, $Y_1$, $A_1$ | $Y_0$, $A_0$, $Y_1$, $A_1$ |
| YYYY (4:0:0) | $Y_0$, $Y_1$, $Y_2$, $Y_3$ | $Y_0$, $Y_1$, $Y_2$, $Y_3$ |

In TABLE 1, the encode column shows how the encoded blocks can be interleaved, and the decode column shows what an output pixel can look like. A "–" in the table means that nothing is stuffed into that component position for that particular format.

Variable-Length Packet

Figure 6:
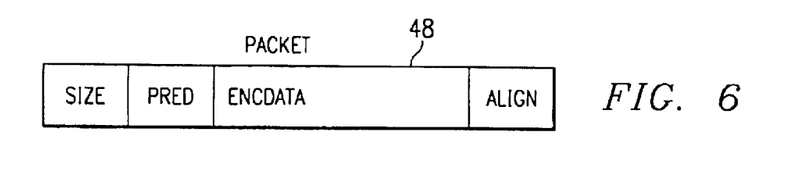
FIG. 6 is a diagram of one embodiment of a variable-length packet used for parallelism according to the present invention.

In contrast with the fixed-length packet, FIG. 6 is a diagram of one embodiment of a variable-length packet 48 used for parallelism according to the present invention. The bitstream can be broken into variable-size packets 48 with each packet encoding the same number of samples. Each packet can be independent such that no other information is needed about other packets to decode the current packet. In general, each packet 48 can start off with a length marker giving the length of the packet and can be byte aligned. The length field and byte alignment allows a distributor to determine the end of a packet rapidly and send a packet of data efficiently to a decoding unit. Thus, as shown in FIG. 6, the Size field can tell the total size of the packet in bytes. The Pred field can be a starting predictor to use for the first sample of the packet. This predictor value can be encoded. The EncData field can be variable-length data encoded using regular LCF compression. For example, if each packet contains N samples, then N-1 of the deltas are encoded in this section. Only N-1 deltas instead of N need to be encoded since the first sample of the packet can be held in the Pred field. The Align field can be any padding bits needed to byte align the packet.

Analogous to the fixed-length packets, this scheme allows the size information to be embedded and distributed into the bitstream instead of having a table of size information as a header for the bitstream. Otherwise, a table of size information would require both the encoder and decoder to buffer this information. With the embedded and distributed size information, the buffering requirements for size information can be minimal.

With respect to boundary conditions, each packet can represent N samples and a new packet can be started for each new scan line. If the number of samples in a scan line is not evenly divisible by N, then the last packet for the line can represent the last sample of the line so that the last packet contains N samples. The decoder can then discard replications, if necessary. Further, at the end of a compressed image, zero-value bits can be padded in to achieve double-word alignment for the compressed image.

With respect to interleaving, the N samples of a packet can represent values from a single component. The input into the encoder system can be pixels, and the output from the decoder system can be pixels. Pixels consist of one or more components. To make it easier to assemble pixels on the decode side, the components can be interleaved. For example, when encoding N pixels with each pixel having 4 components (RGBA, 4:4:4:4), there would be a packet of G, then a packet of B, and finally a packet of A before moving on to the next N pixels. Each packet contains N samples of a particular component. The interleaving schemes could be as follows:

TABLE 2

| Format | Encode | Decode |
| --- | --- | --- |
| RGBA (4:4:4:4) | R, G, B, A | R, G, B, A |
| RGB (4:4:4) | R, G, B | R, G, B, - |
| YCrCb (4:2:2:4) | Cb, $Y_0$, Cr, $Y_1$ | Cb, $Y_0$, Cr, $Y_1$ |
| YCrCbA (4:2:2:4) | Cb, $Y_0$, $A_0$, Cr, $Y_1$, $A_1$ | Cb, $Y_0$, $A_0$, Cr, $Y_1$, $A_1$ |
| YAYA (4:0:0:4) | $Y_0$, $A_0$, $Y_1$, $A_1$ | $Y_0$, $A_0$, $Y_1$, $A_1$ |
| YYYY (4:0:0) | $Y_0$, $Y_1$, $Y_2$, $Y_3$ | $Y_0$, $Y_1$, $Y_2$, $Y_3$ |

In TABLE 2, the encode column shows how the packets can be interleaved, and the decode column shows what an output pixel can look like. A "–" means that nothing is placed into that component position for that particular format.

Parallel Encoder System

Figure 7:
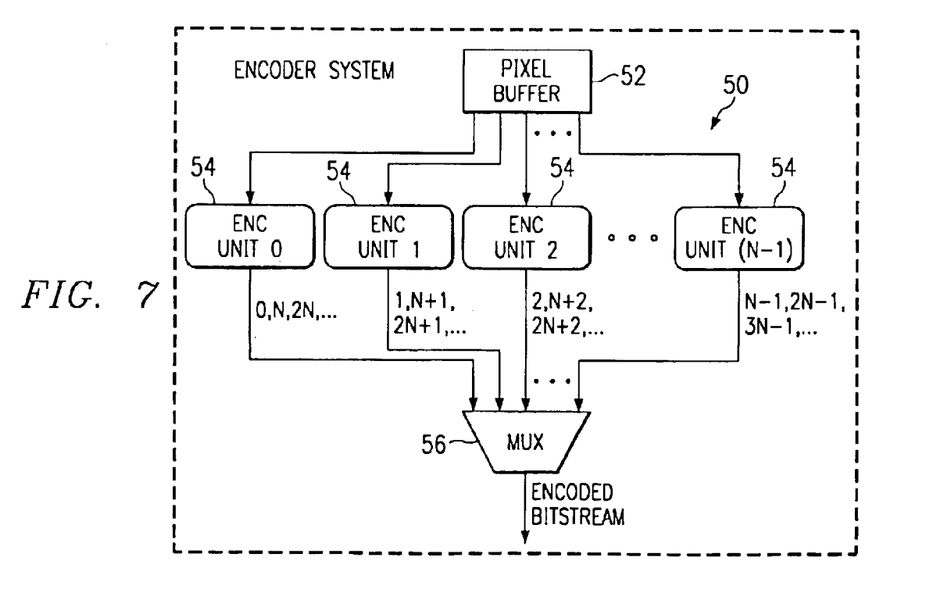
FIG. 7 is a block diagram of one embodiment of a parallel encoder system according to the present invention.

FIG. 7 is a block diagram of one embodiment of a parallel encoder system, indicated generally at 50, according to the present invention. Encoder system 50 comprises a pixel buffer 52 that feeds a plurality of encoder units 54. Encode units 54, in turn, feed a multiplexer 56 which builds an encoded bitstream. Encode units 54 can be associated with processing and producing packets for particular lines or components, as shown. Encoder system 50 can be implemented to parallelize the encoded bitstream using fixed-length packets or using variable-length packets. For fixed-length packets, each encode unit 54 can be associated with particular lines (e.g., 0, N, 2N, . . . ). For variable-length packets, each encode unit 54 can be associated with particular components and component types (e.g., 0, N, 2N, . . . ).

For variable-length packets, encoder system 50 can be parallelized by having multiple encode units 54 working on different packets at the same time. Each encode unit 54 can work on a different packet of N samples. To allow for parallel encoding, the incoming pixel buffer 52 can allow for as many simultaneously readers as there are parallel encode units 54. Also, the packets need to be processed in the order necessary to output the proper interleaved-components format in the encoded bitstream.

For fixed-length packets, encoder system 50 again can be parallelized by having multiple encoder units 54 working on different packets at the same time. In this scheme, the pixel buffer 52 holds a V×H region of pixels at a time. Each encode unit 54 can work on one of the V different segments (portion of a line with H pixels). As above, to allow for parallel encoding, the incoming pixel buffer 52 needs to allow for as many simultaneous readers as there are parallel encode units 54. Also, the packets must be processed in the packet interleaving pattern specified above. All of the complete packets that can be made from the V×H region of pixels in pixel buffer 52 are output in the encoded bitstream before working on the next V×H region of pixels.

Parallel Decoder System

Figure 8:
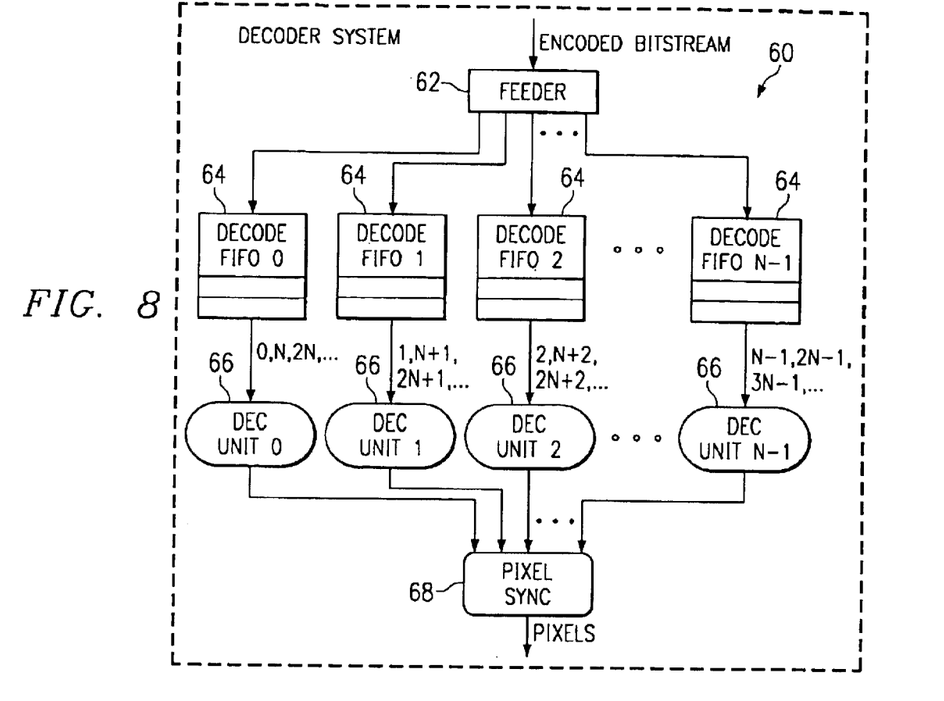
FIG. 8 is a block diagram of one embodiment of a parallel decoder system according to the present invention.

FIG. 8 is a block diagram of one embodiment of a parallel decoder system, indicated generally at 60, according to the present invention. Encoder system 60 comprises a feeder (distributor) 62 that feeds a plurality of decode queues (FIFO) 64. A plurality of decode units 66 are each associated with one of decode queues 64. Decode units 66, in turn, feed a pixel sync 68 which provides decoded pixel outputs. Decode units 66 can be associated with processing packets for particular interleaved lines, as shown. Decoder system 60 can be implemented to process a bitstream parallelized using fixed-length packets or using variable-length packets. As above, for fixed-length packets, each decode queue 64 and decode unit 66 pair can be associated with particular lines (e.g., 0, N, 2N, . . . ). For variable-length packets, each decode queue 64 and decode unit 66 pair can be associated with particular components and component types (e.g., 0, N, 2N, . . . .

Decode of Variable-Length Packets

FIGS. 9A, 9B, 9C, 9D, 9E, 9F, and 9G are block diagrams of one embodiment of the processing of variable-length packets by feeder 62 in parallel decode system 60 according to the present invention. Since each variable-length packet is independent, the decoding process can be parallelized. Feeder 62 takes in the compressed encoded bitstream and distributes different packets to different decode queues 64 and decode units 66. In the embodiment of FIGS. 9A–9G, the compressed bitstream is received by an input queue (FIFO) 70. A multiplexer 72 pulls bits from input queue 70 and feeds a register 74. The contents of register 74 are provided to a left shift logic 76 and to a demultiplexer 78. Demultiplexer 78 then distributes the bits to the appropriate decode queue 64.

In this scheme, because each packet has a length field and can be byte-aligned (see FIG. 6), feeder 62 can efficiently distribute the packets. Having feeder 62 feed multiples of four decode units 66 (i.e., 4,8,12, etc.) can make implementation simpler since pixels can be created based on interleaving four components (or less) as shown above in TABLE 2. An assumption for feeder 62 is that feeder 62 can supply data to decode queues 64 and decode units 66 as fast as or faster than the rate which the combined number of decode queues 64 and decode units 66 can consume data. To decode multiple packets in a concurrent fashion, decode queues 64 are used so feeder 62 can distribute packets to other decoder units 66 while a decode unit 66 can be still busy processing packets it has received. Each packet that a decoder unit 66 receives can be decoded into N samples for a single component. As is explained above with respect to interleaving, the components are interleaved to form pixels. The pixel maker logic of pixel sync 68 can take the component samples output from decode units 66 and can interleave them to form pixels according to the specified sampling format.

One key to parallel decoding can be the ability for feeder 62 to send packets rapidly to decoder units 66. FIGS. 9A–9G illustrate one embodiment of how feeder 62 can distribute packets. In particular, FIGS. 9A–9G show two example packets (PACKET 0 and PACKET 1) flow through feeder 62. Byte alignment can allow for a simple, efficient process where the depth of multiplexing can be reduced, and the length field can be quickly parsed. Being able to quickly distribute packets can depend on being able to pick out the length field of a packet efficiently. Picking out the length field would get complicated if the length field could get broken up into two entries of input queue 70. In such a case, determining the length of a packet could take two cycles.

With byte alignment and assuming the queue width can be some integral number of bytes greater than one, if a packet ends in the middle of queue entry, then the smallest amount of space left in the queue entry for the next packet can be a byte. This means that as long as the length field is eight bits or less, the length field can be guaranteed to not be divided between two queue entries. Eight bits allows the length field to represent packets up to 256 bytes. One disadvantage of byte-alignment can be the extra padding which could be required for alignment. However, this overhead can be typically small on average and only four bits are wasted for alignment on average. However, an advantage is that the length field can be in bytes instead of bits, thus the length field can be three bits shorter with byte alignment than without this alignment.

Figure 9A:
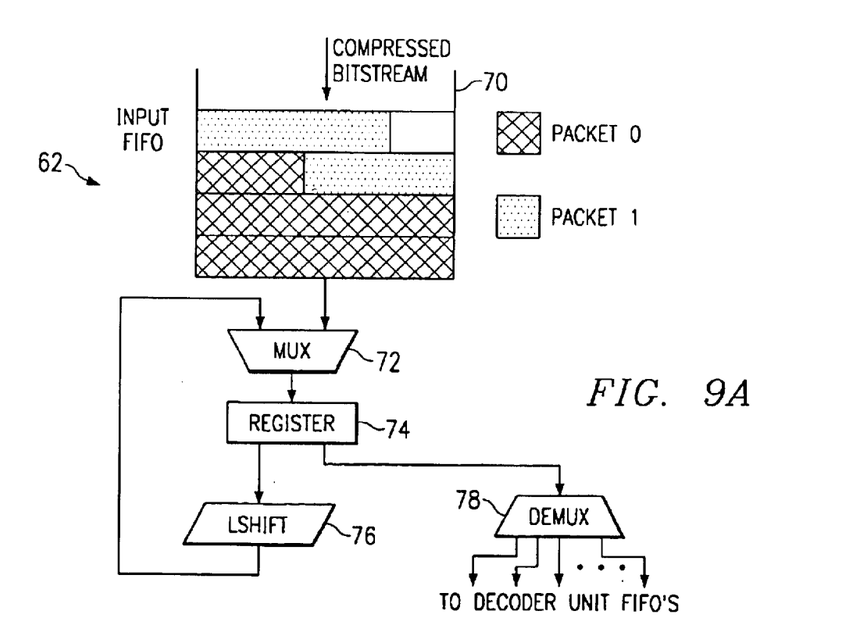
FIGS. 9A, 9B, 9C, 9D, 9E, 9F, and 9G are block diagrams of one embodiment of the processing of variable-length packets by the feeder in the parallel decode system of FIG. 8 according to the present invention.
Figure 9B:
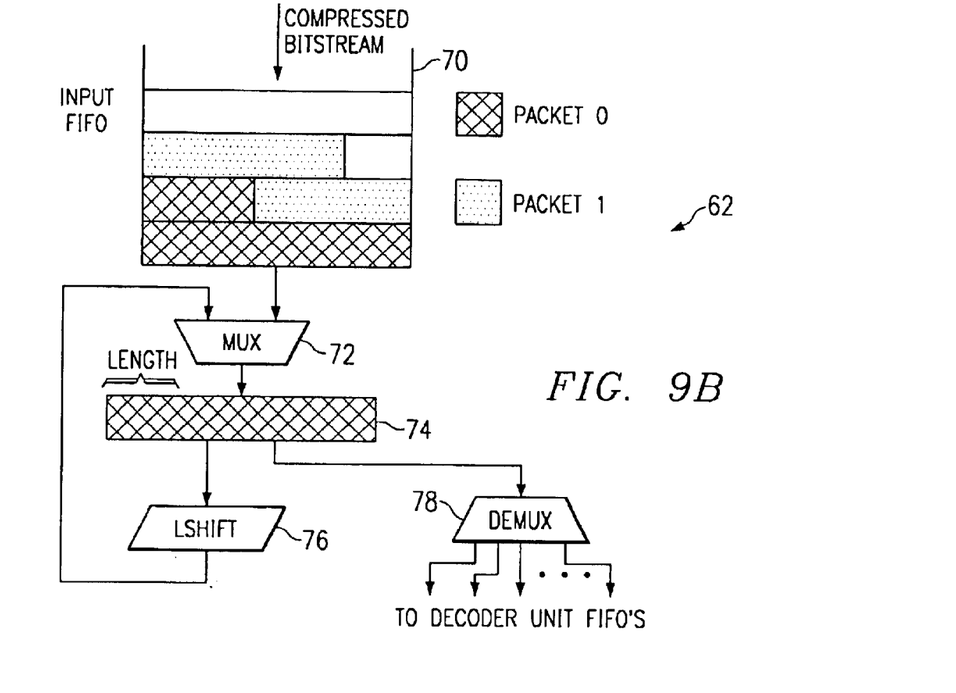
Figure 9C:
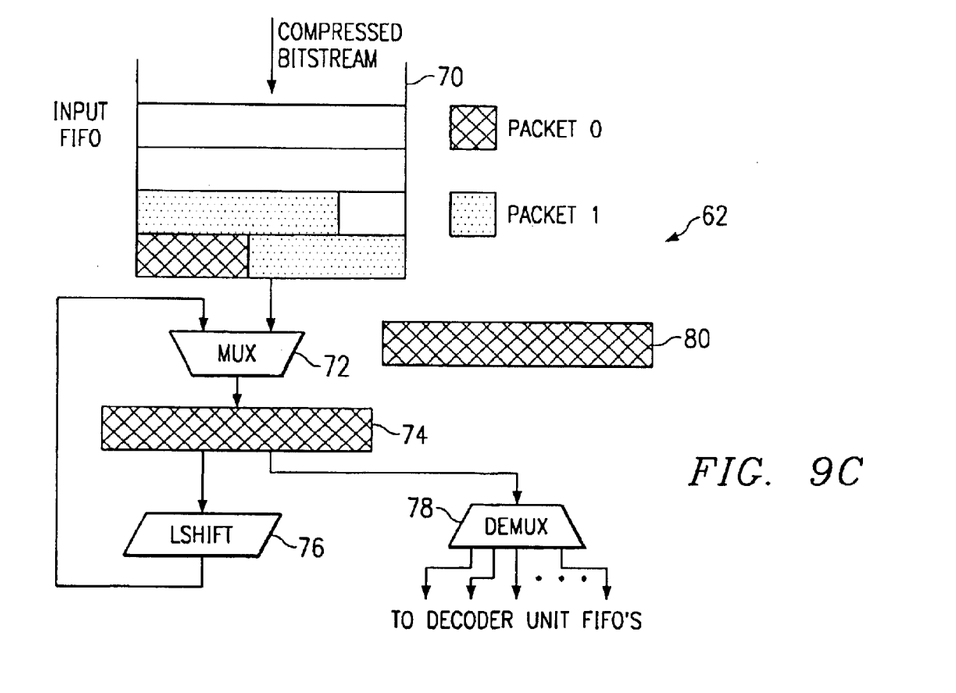
Figure 9D:
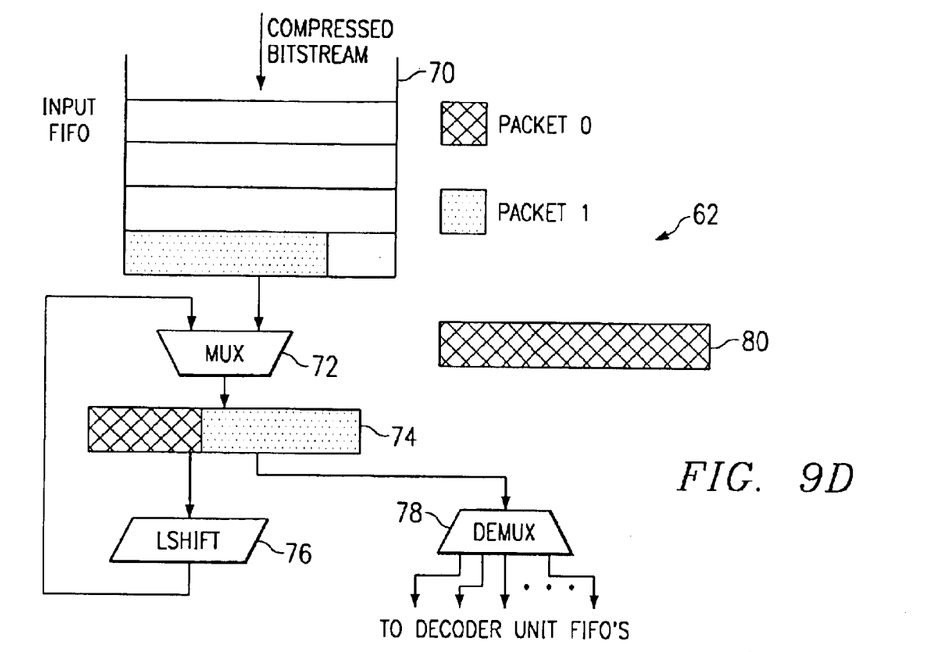
Figure 9E:
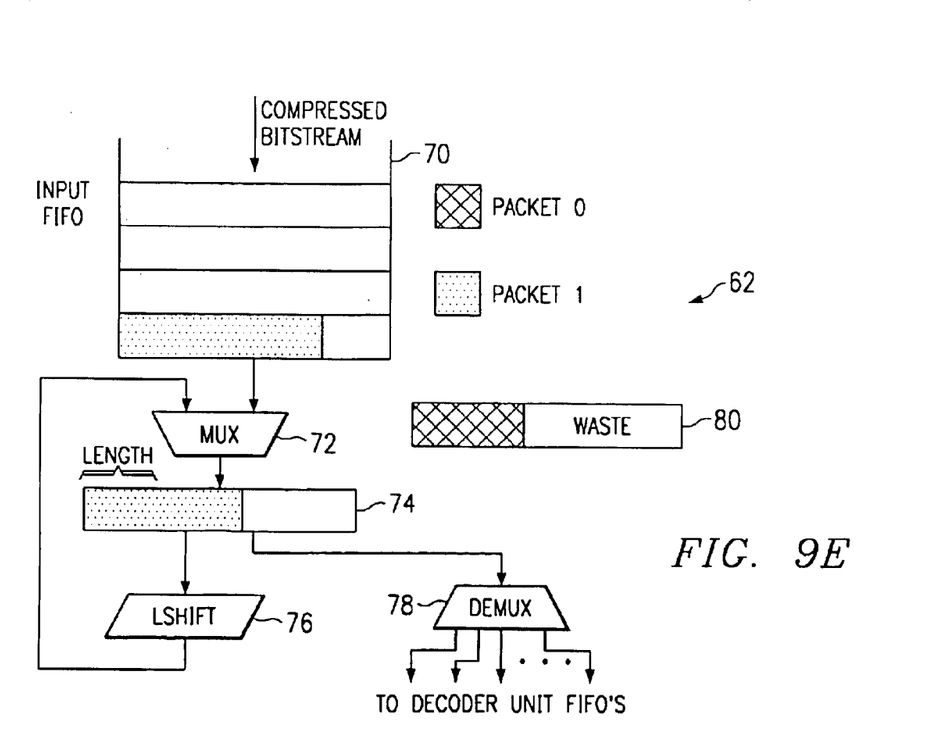
Figure 9F:
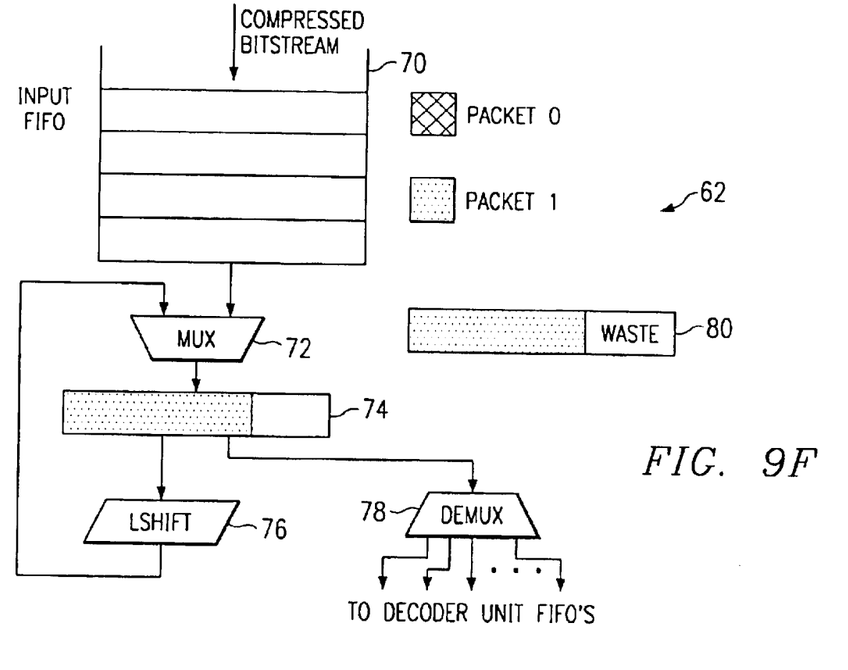
Figure 9G:
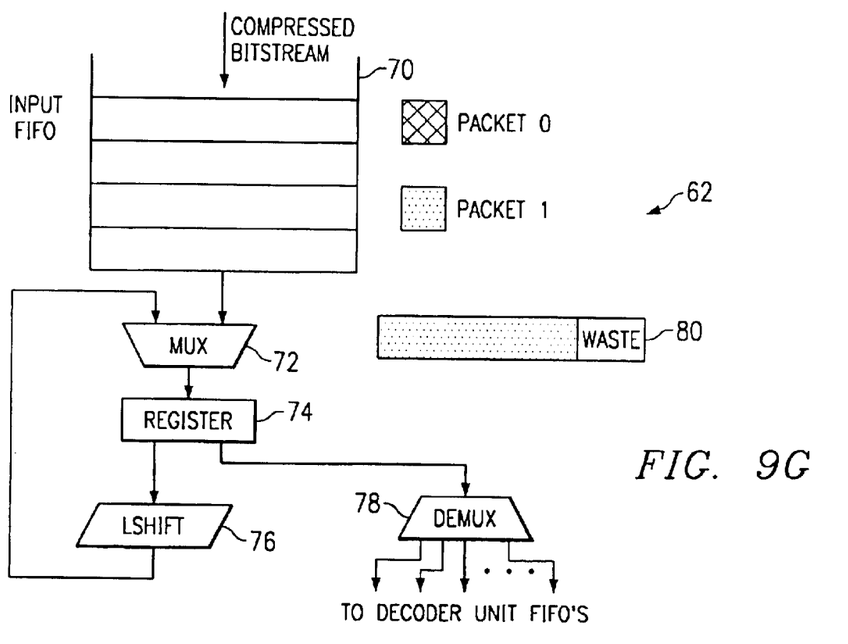

In FIGS. 9A–9G, PACKET 0 is shown to start aligned to a queue entry. Although PACKET 1 starts in the middle of a queue entry, by the time PACKET 1 needs to be processed, its length field has been left-justified in register 74 (FIG. 9E). This means that as long as the length field is eight bits or less, feeder 62 can easily pick out the length field by examining just the left-most bits in register 74. Remember that for a variable-length packet, the first field can be the length (see FIG. 6). This simplifies the logic since finding the length can be simply looking at these left-most bits. FIGS. 9B and 9E show how the length field ends up in the left-most bits of register 74. Another thing to note is the wasted space which can occur at the start or end of transferring a packet. Wasted space translates into wasted bandwidth. For PACKET 0, FIG. 9C shows no space is wasted to send the first portion of the packet because the packet started aligned to the queue entry. Also, the second portion wastes no space because it takes up the entire entry as shown in FIG. 9D. However, in FIG. 9E, it is shown that the last portion for PACKET 0 wastes space because it ends in the middle of a queue entry. Wasted space results because only a portion of data gets sent to a decode unit 66. This means if a queue entry contains portions of two packets, it will take two transfers to distribute this data with each transfer having wasted space. For PACKET 1, space is wasted for sending the first portion (FIG. 9F) because the packet does not start aligned to a queue entry. Also, space can be wasted for sending the last chunk (FIG. 9G) because the packet does not end aligned to a FIFO entry.

With respect to packet size, there are several things to consider when trying to determine a good packet size. In order to parallelize the bitstream, overhead is incurred for the size, predictor, and byte alignment fields. This overhead makes the compression ratio somewhat worse, thus making the packet longer helps to amortize the overhead costs. Another reason to increase the packet size can be to increase the parallelism realized. Given that input queue 70 coming into feeder 62 is some fix length and only one queue entry can be pulled out per cycle, the maximum performance that can be achieved is when the decoder system throughput rate is equal to the number of samples in a queue entry per cycle. For example, if, on average, a queue entry has 16 compressed samples, then the maximum decoder system throughput would be 16 samples per cycle. However, as mentioned above, feeder 62 may have inefficiencies where space might get wasted when sending either the first and/or last portion of a packet because of misalignment with the queue entry. This decreases the amount of parallelism realized. However, this problem can be offset by making the size of a packer bigger so that the wasted space (bandwidth) from sending the first and last portion of a packet can be small compared to the overall packet size. A portion of a packet which is not the first and/or last portion occupies an entire queue entry and can be sent with no wasted space (FIG. 9D). However, packets can be made too big. As FIG. 8 shows, each decode unit 66 needs to be able to buffer a packet. As the packet size grows, the amount which must get buffered by each decoder unit 66 increases. This type of on-chip buffering can be relatively expensive.

With respect to sustainable parallelism, misalignments for the first and last portion of data transmitted by feeder 62 can limit achievable parallelism. For example, if 32 samples per packet, 8 bits per sample, and 2:1 compression ratio are assumed, then the LCF compressed size would be 128 bits for 32 samples. It can also be assumed that the input to the decoder system can be 64 bits wide. Then, in an ideal case, the decode throughput rate would be 32 samples in two cycles. This can be the fastest rate possible given that the input is limited to 64 bits/cycle. This 32 samples in two cycles results in an ideal sustainable parallelization of 16 (i.e., 32/2). Thus, up to 16 units could be kept fully busy in this scenario. Actual sustainable parallelization means that the combined rate of data consumption by all decoder units 66 is less than or equal to the rate which feeder 62 can send out packet data. In reality, the ideal sustainable parallelization is not achievable because of the inefficiencies of feeder 62 resulting from misalignments with the queue entries.

Sustainable parallelization can be calculated by taking the number of samples in a packet and dividing it by the number of cycles to dispatch the packet. For example, if a packet contains 32 samples and it takes the feeder four cycles to dispatch this packet, then the sustainable parallelism can be 8 (i.e., 32/4). Thus, eight decode units 66 could be kept fully busy in this example.

For one implementation, the variable-length packets contain 32 samples or 64 samples. As a reminder, conventional LCF uses blocks of 15 to 16 samples (see FIG. 3). The mode field can be 3 bits for B-bit samples and 4 bits for 9 to 12-bit samples. Further, as a reminder, a variable-length packet as set forth above includes three additional fields (Size, Pred and Align) in addition to the conventional LCF block (EncData) (see FIG. 6). Thus, for 32-sample packets, the EncData section will contain 31 encoded samples (63 encoded samples for 64-sample packets). Conventional LCF uses blocks of 15 to 16 deltas, and these blocks are encoded using a look-up table. To re-use these look-up tables, 31 samples can be encoded as 1 block of 16 deltas followed by 1 block of 15 deltas. For 64 sample packets, 63 samples can be encoded in the EncData section as 3 blocks of 16 deltas followed by 1 block of 15 deltas. The following table provides example lengths for the fields in these two cases.

TABLE 3

| 32-sample packet | Size: 6 bits<br>Pred: 8–12 bits depending on sample precision<br>EncData: 37–380 bits depending on compression ratio<br>Align: 0–7 bits depending on padding needed |
|---|---|
| 64-sample packet | Size: 7 bits<br>Pred. 8–12 bits depending on sample precision<br>EncData: 75–772 bits depending on compression ratio<br>Align: 0–7 bits depending in padding needed |

With respect to buffering requirements, buffering can be based on a simple-buffering scheme. Everything can be double buffered. There may be more efficient ways of using less buffering, but this provides a general idea about the buffer sizes. An important point to remember is that for compressed data, the buffer size needs to be enough to support the worst case compression ratio. In the worst case, the samples are unencoded with the overhead of the mode bits for the block(s) and the overhead of the size, predictor, and alignment fields for the packet. The following table provides example buffering capacity.

TABLE 4

| 32-sample packet | Decode | Input - 128 bytes/(decode unit)<br>Output - 128 bytes/(decode unit) |
|---|---|---|
| | Encode | Pixel Buffer - 256 bytes<br>Delta Buffering (within each Encode Unit) 128 bytes/(encode unit)<br>Output Buffering (within each Encode Unit) - 128 bytes/(encode unit) |
| 64-sample | Decode | Input - 256 bytes/(decode unit) |

TABLE 4-continued

| packet | | Output - 256 bytes/(decode unit) |
|---|---|---|
| | Encode | Pixel Buffer - 512 bytes<br>Delta Buffering (within each Encoder Unit) - 256 bytes/(encode unit)<br>Output Buffering (within each Encoder Unit) - 256 bytes/(encode unit) |

The performance of conventional LCF and LCF after parallel compression using variable-length packetized bitstream can be compared. The following tables give such comparisons for 32-sample and 64-sample variable-length packets. The numbers in the tables are estimates based on assumptions and can be confirmed with actual data from images. The "Parallelized LCF" and "LCF" columns show the size of the compressed data in images. The "% Overhead" column shows the overhead caused by the extra data in Parallelized LCF. This overhead can be calculated as a percentage: (Par_LCF_size−LCF_size)/LCF_size*100%. In the tables, the first number in parentheses in the "Parallelized LCF" column shows the fewest number of cycles needed to dispatch a packet. For these tables, it can be assumed that the feeder datapath is 64 bits. This means the input queue width, register, and left shifter widths are all 64 bits. Thus, the number of cycles needed to dispatch can be calculated simply as: ceil(data_size/64). This number can be the better case because in the worse case one extra cycle can be needed due to queue entry misalignment. The second number in parentheses is the best sustainable parallelism for the specific case. This number can be equal to the number of components in a packet divided by the number of cycles to dispatch (first number in parentheses).

Going through the rows of the tables, "uncompressed" refers to the case where the data can be represented unencoded (uncompressed). "Best case" is the smallest packet which can be achieved. Remember packetization incurs the overhead for the size, predictor, and alignment fields. Thus, in the best case, the EncData field requires just 1 bit/sample plus the mode field overhead per block. The alignment field can be the number of bits needed to get the best-case packet to be a multiple of 8 bits. For the "average case", the LCF column assumes a compression ratio of 2:1 versus uncompressed. For Parallelized LCF, a compression ratio of 2:1 versus uncompressed is assumed for the data in the EncData field. Once again, Parallelized LCF incurs overhead for the size, predictor, and alignment field. For average case, the alignment field is assumed to be four bits. Lastly, "worst case" occurs when the samples need to be packed unencoded plus the overhead of the mode field per block. Parallelized LCF incurs the additional overhead of the size, predictor, and alignment fields. The alignment field can be the number of bits needed to get the worst-case packet to be a multiple of 8 bits.

32-SAMPLE PACKETS

TABLE 5

| | 8-BIT COMPONENTS | | |
|---|---|---|---|
| Case | Parallelized LCF | LCF | % Overhead |
| Uncompressed | — | 256 | |
| Best | 56 (1, 32) | 38 | 48% |
| Average | 142 (3, 10) | 128 | 11% |

TABLE 5-continued

8-BIT COMPONENTS

| Case | Parallelized LCF | LCF | % Overhead |
|---|---|---|---|
| Worst | 272 (5, 6) | 262 | 4% |

TABLE 6

10-BIT COMPONENTS

| Case | Parallelized LCF | LCF | % Overhead |
|---|---|---|---|
| Uncompressed | — | 320 | |
| Best | 56 (1, 32) | 40 | 40% |
| Average | 175 (3, 10) | 160 | 10% |
| Worst | 336 (6, 5) | 328 | 3% |

TABLE 7

12-BIT COMPONENTS

| Case | Parallelized LCF | LCF | % Overhead |
|---|---|---|---|
| Uncompressed | — | 384 | |
| Best | 64 (1, 32) | 40 | 60% |
| Average | 208 (4, 8) | 192 | 9% |
| Worst | 400 (7, 4) | 392 | 2% |

TABLE 8

8-BIT COMPONENTS

| Case | Parallelized LCF | LCF | % Overhead |
|---|---|---|---|
| Uncompressed | — | 512 | |
| Best | 96 (2, 32) | 76 | 26% |
| Average | 271 (5, 12) | 256 | 6% |
| Worst | 544 (9, 7) | 524 | 4% |

TABLE 9

10-BIT COMPONENTS

| Case | Parallelized LCF | LCF | % Overhead |
|---|---|---|---|
| Uncompressed | — | 640 | |
| Best | 96 (2, 32) | 80 | 20% |
| Average | 336 (6, 10) | 320 | 5% |
| Worst | 664 (11, 5) | 656 | 1% |

TABLE 10

12-BIT COMPONENTS

| Case | Parallelized LCF | LCF | % Overhead |
|---|---|---|---|
| Uncompressed | — | 768 | |
| Best | 104 (2, 32) | 80 | 30% |
| Average | 401 (7, 9) | 384 | 5% |
| Worst | 792 (13, 4) | 784 | 1% |

Decode of Fixed-Length Packets

Figure 10A:
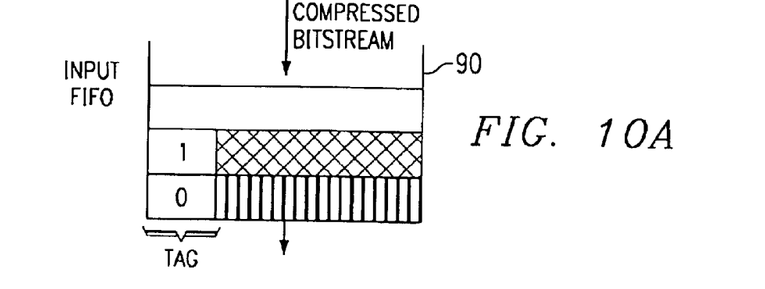
FIGS. 10A, 10B and 10C are block diagrams of one embodiment of the processing of fixed-length packets by the feeder in the parallel decode system of FIG. 8 according to the present invention.
Figure 10B:
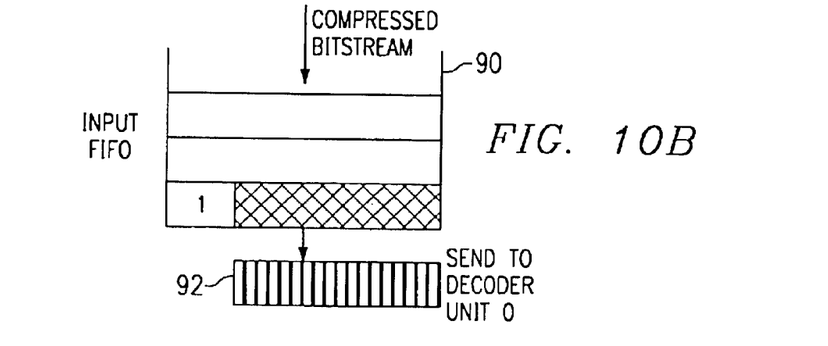
Figure 10C:
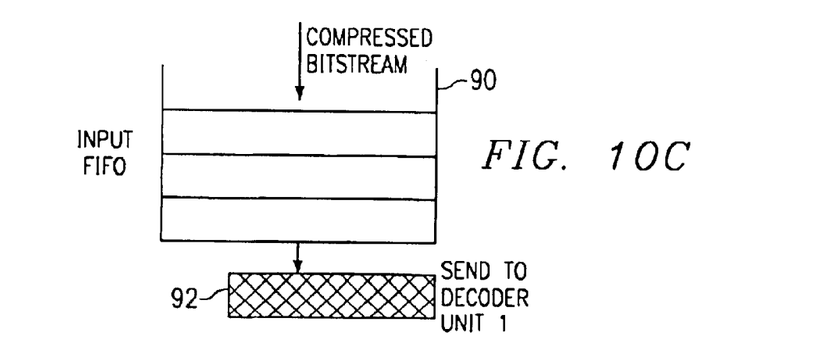

FIGS. 10A, 10B and 10C are block diagrams of one embodiment of the processing of fixed-length packets by feeder 62 of in parallel decode system 60 (of FIG. 8) according to the present invention. The decoding process can be easily parallelized since each packet is a fixed-length, has tag bits that provide a target decoder unit, and is independent of other packets sent to different decoders. In the embodiment discussed above, packets with different tags represent encoded data from different lines. Two different lines are independent and thus can be decoded in parallel. Data from the same line can be dependent and goes to the same decoder because these packets have the same tag bits. Also, the length of the packet can be optimized to be some multiple of the width of the input buffer coming into decoder system 60. Having the packet size be a multiple of the buffer width allows the packets to be distributed efficiently.

Feeder 62 can take the compressed bitstream into an input queue (FIFO) 90 as shown in FIG. 10A. Feeder 62 can then distributes different packets according to the tags as shown in FIGS. 10A and 10B. One assumption for feeder 62 is that it can supply data to decode units 66 as fast as or faster than the rate which the combined number of decoder units 66 can consume data. To decode multiple packets in a concurrent fashion, decode queues 64 are needed so feeder 62 can distribute packets to other decode units 66 while a unit can be still busy processing the packet(s) it has received. Each decode unit 66 receives packets which decodes in to a different scan line from the packets sent to other units 66. After feeder 62 has distributed the packets of a multi-pack, each decode unit 66 will output H pixels for one of the V lines in the V×H region. The pixel sync logic 68 makes sure that the H pixels from each decode unit 66 are output in the correct order to reconstruct the V×H rectangular region.

One of the keys to parallel decoding can be the ability for feeder 62 to send packets rapidly to decode units 66. FIGS. 10A–10C show how feeder 62 can distribute fixed-length packets. To simplify the diagram, FIGS. 10A–10C show that each packet can be the same size as the width of input queue 90. However, just by having the packet length be some multiple of the input queue width, the logic can be simple. The idea is that feeder 62 can extract the tag from the start of each packet. Since each packet is a fixed width and the tag is a fixed width, the tag can be easily extracted. Thus, the tag can be stripped from the packet, and the remaining EncData field of the packet can be shipped to the proper decode unit 66 based upon the tag bits. Consequently, the feeder logic can be relatively straightforward.

There are several factors to consider when trying to determine a good packet size for the fixed-length packets. This scheme for parallelized LCF incurs the overhead from the tag filed while conventional LCF only has the EncData section. This overhead makes the compression ratio worse so that making the packet longer helps to amortize the overhead costs. However, packets can not be made arbitrarily large due to buffering requirements. As shown in FIG. 8, each decode unit 66 needs to be able to buffer some data. This buffering is needed so that while feeder 62 is distributing data to the other decoder units 66, the current decode unit 66 has data in its decode queue 64 to work on. For a multi-pack, some decoder units 66 might get more packets than other units 66 because of variation in compression ratios. In an effort to balance out these variations, the queue 64 in front of each decode unit 66 can be able to store some multiple number of packets.

For one implementation, the fixed-length packets contain 64 bits, and, as a reminder, the fixed-length LCF packet is shown in FIG. 3. The queue width into the decode system can be assumed also to be 64 bits. Also, the current level of parallelism desired can be 4 (or possibly 8), and the multi-pack region would be V=4 (or 8) and H=32. The following table provides example lengths for the fields in these cases.

TABLE 11

| Parallelism by 4 | Tag: 2 bits |
| | EncData: 62 bits |
| | Tag Overhead: 3% |
| Parallelism by 8 | Tag: 3 bits |
| | EncData: 61 bits |
| | Tag Overhead: 5% |

Buffering for this example can be based on a simple double-buffering scheme. Buffering multiple packets per decode unit can be required to balance out the different compression ratios between the packets going to different decode units. Experimental data has shown that buffering 4 packets per decode unit provides high efficiency in all test cases. Regardless of compression ratio, a decode unit will generally output the same number of samples for a given number of cycles. Variable compression ratios means that some decode units will get more packets than others. Because all the units decode roughly the same number of samples in a given number of cycles, units which get more packets from a multi-pack consume their data faster than units which get less data. This works in favor for allowing the input buffering per decoder unit to be fairly small. Finally, an important point to remember is that, when handling compressed data, the buffer size needs to be big enough to support the worst case compression ratio. The following table shows example buffering for 64-bit packets.

TABLE 12

| Decode | Input - 64 bytes/(decode unit) |
| | Output - 128 bytes/(decode unit) |
| Encode | Pixel Buffer - 512 bytes |
| | Delta Buffering (within each Encode Unit) - 128 bytes/(encode unit) |
| | Output Buffering (within each Encode Unit) - 128 bytes/(encode unit) |

Although the present invention has been described in detail, it can be understood that various changes, substitutions and alterations can be made thereto without departing from the sphere and scope of the invention as defined by the appended claims.

What is claimed is:

1. A system for parallel compression and decompression of a bitstream, comprising:

an encoder system comprising:
 a plurality of encode units operable to receive components of a pixel separated from a bitstream and to encode the components using a compression algorithm;
 the encode units further operable to construct packets from the encoded components, where at least one packet is associated with each encoded component and the at least one packet comprises header information and encoded data and wherein the header information comprises a length, a size and an alignment; and
 a multiplexer coupled to the encode units, the muliplexer operable to combine the packets into a packetized encoded bitstream; and a decoder system comprising:
 a feeder operable to separate packets from the packetized encoded bitstream, wherein the feeder comprises:
 an input queue operable to receive the packetized encoded bitstream;
 a multiplexer coupled to the input queue;
 a register coupled to the multiplexer;
 a demultiplexer coupled to the register and to the decode queues; and
 a left shift unit coupled to the register and to the multiplexer;
 a plurality of decode queues, the feeder further operable to distribute the packets in order to the decode queues;
 a plurality of decode units each associated with one of the decode queues, the decode units operable to decode packets using a decompression algorithm to recover the encoded data and to reconstruct the components; and
 a demultiplexer coupled to the plurality of decode units the demultiplexer operable to combine the plurality of components to recover the bitstream.

2. The system as recited in claim 1 wherein the compression algorithm comprises differential pulse code modulation.

* * * * *